(12) United States Patent
Malamal Vadakital et al.

(10) Patent No.: US 11,528,469 B2
(45) Date of Patent: Dec. 13, 2022

(54) APPARATUS, A METHOD AND A COMPUTER PROGRAM FOR VIEWING VOLUME SIGNALLING FOR VOLUMETRIC VIDEO

(71) Applicant: Nokia Technologies Oy, Espoo (FI)

(72) Inventors: Vinod Kumar Malamal Vadakital, Tampere (FI); Kimmo Roimela, Tampere (FI); Johannes Pystynen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/268,373

(22) PCT Filed: Aug. 13, 2019

(86) PCT No.: PCT/FI2019/050585
§ 371 (c)(1),
(2) Date: Feb. 12, 2021

(87) PCT Pub. No.: WO2020/035633
PCT Pub. Date: Feb. 20, 2020

(65) Prior Publication Data
US 2021/0321083 A1 Oct. 14, 2021

(30) Foreign Application Priority Data
Aug. 13, 2018 (FI) .................................... 20185679

(51) Int. Cl.
*H04N 13/388* (2018.01)
*G02B 27/01* (2006.01)
(Continued)

(52) U.S. Cl.
CPC ......... *H04N 13/388* (2018.05); *G02B 27/017* (2013.01); *G06F 3/011* (2013.01);
(Continued)

(58) Field of Classification Search
None
See application file for complete search history.

(56) References Cited

U.S. PATENT DOCUMENTS

| | | | | |
|---|---|---|---|---|
| 2004/0105573 A1* | 6/2004 | Neumann | ............... | G06T 17/00 382/103 |
| 2005/0123171 A1* | 6/2005 | Kobayashi | .............. | G06F 3/011 382/103 |

(Continued)

FOREIGN PATENT DOCUMENTS

| | | |
|---|---|---|
| CN | 1627237 A | 6/2005 |
| CN | 101124508 A | 2/2008 |

OTHER PUBLICATIONS

"Experimenting with Light Fields", Google Blog, Retrieved on Feb. 3, 2021, Webpage available at : https://www.blog.google/products/google-vr/experimenting-light-fields/.

(Continued)

*Primary Examiner* — Talha M Nawaz
(74) *Attorney, Agent, or Firm* — Joseph C. Drish; Harrington & Smith

(57) ABSTRACT

There are disclosed various methods, apparatuses and computer program products for viewing volume signalling of volumetric video. In accordance with an embodiment of a method information of a viewing volume appropriate for viewing a volumetric video is obtained. The viewing volume is examined to determine what geometrical shapes describe the viewing volume. One or more geometrical shapes determined for describing the viewing volume are selected, wherein signalling information for the selected one or more geometrical shapes is constructed.

25 Claims, 9 Drawing Sheets

(51) Int. Cl.
*G06F 3/01* (2006.01)
*G06T 7/70* (2017.01)

(52) U.S. Cl.
CPC .......... *G06T 7/70* (2017.01); *G02B 2027/014* (2013.01); *G02B 2027/0138* (2013.01)

(56) References Cited

U.S. PATENT DOCUMENTS

| | | | | |
|---|---|---|---|---|
| 2009/0185719 | A1* | 7/2009 | Erignac | G06T 7/292 382/104 |
| 2011/0202510 | A1 | 8/2011 | Salemann | 707/693 |
| 2016/0253842 | A1* | 9/2016 | Shapira | G06T 19/006 345/633 |
| 2016/0350973 | A1* | 12/2016 | Shapira | G06F 3/016 |
| 2017/0244948 | A1 | 8/2017 | Pang et al. | 13/14 |
| 2018/0097867 | A1* | 4/2018 | Pang | H04N 5/22541 |
| 2021/0321083 | A1* | 10/2021 | Malamal Vadakital | H04N 21/816 |

OTHER PUBLICATIONS

"Distance Functions", Inigo Quilez, Retrieved on Feb. 3, 2021, Webpage available at : http://iquilezles.org/www/articles/distfunctions/distfunctions.htm.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 14: MP4 File Format", ISO/IEC 14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.

Office action received for corresponding Finnish Patent Application No. 20185679, dated Apr. 9, 2019, 8 pages.

International Search Report and Written Opinion received for corresponding Patent Cooperation Treaty Application No. PCT/FI2019/050585, dated Dec. 12, 2019, 16 pages.

Deshpande et al., "[OMAF] Signaling of Viewing Space", ISO/IEC JTC1/SC29/WG11 MPEG2018/m43960, Sharp, Jul. 2018, 9 pages.

"Constructive Solid Geometry", Wikipedia, Retrieved on Feb. 3, 2021, Webpage available at : https://en.wikipedia.org/w/index.php?title=Constructive_solid_geometry&oldid=840660750.

Roimela et al., "Generalized Viewing Space Signalling for Immersive Video", ISO/IEC JTC1/SC29/WG11 MPEG2019/M51487, Nokia Technologies, Oct. 2019, 7 pages.

Schafer, Ralf, "Review and Future Directions for 3D-Video", Picture Coding Symposium, Beijing, CN, Apr. 24, 2006, 12 pages.

Champel, Mary-Luc, et al., "Proposed Draft 1.0 of TR: Technical Report on Architectures for Immersive Media", ISO/IEC JTC1/SC29/WG11/w41907, Oct. 26, 2017, 38 pages.

Deshpande, Sachin, et al., "[OMAF] On Viewing Space Signaling", ISO/IEC JTC1/SC29/WG11/MPEG2018/m43369, Jul. 5, 2018, 8 pages.

* cited by examiner

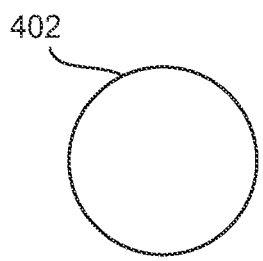
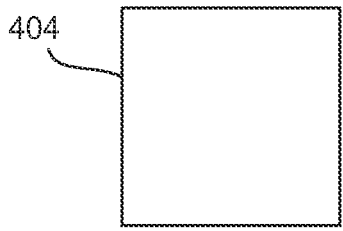
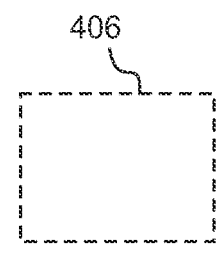
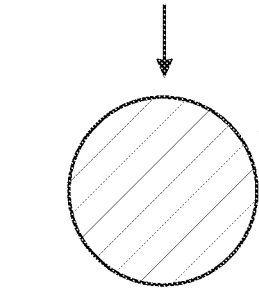
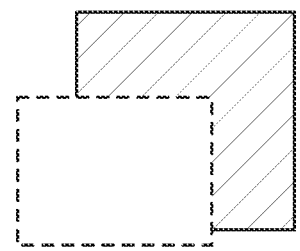
Fig. 4a    Fig. 4b
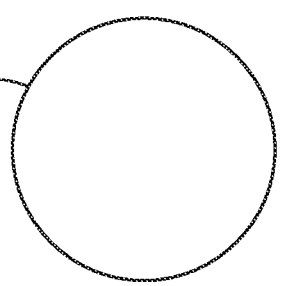
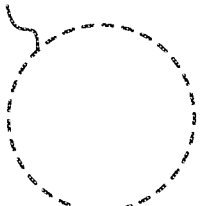
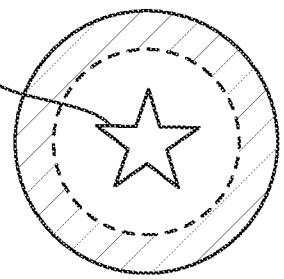
Fig. 4c

APPARATUS, A METHOD AND A COMPUTER PROGRAM FOR VIEWING VOLUME SIGNALLING FOR VOLUMETRIC VIDEO

RELATED APPLICATION

This application claims priority to PCT Application No. PCT/FI2019/050585, filed on Aug. 13, 2019, which claims priority to Finland Application No. 20185679, filed on Aug. 13, 2018, each of which is incorporated herein by reference in its entirety.

TECHNICAL FIELD

Various example embodiments relate to an apparatus, a method and a computer program for viewing volume signalling of volumetric video.

BACKGROUND

Volumetric video and audio data represent a three-dimensional scene with spatial audio, which can be used as input for virtual reality (VR), augmented reality (AR) and mixed reality (MR) applications. The user of the application can move around in the blend of physical and digital content, and digital content presentation is modified according to user's position and orientation. Many of the current applications operate in three degrees-of-freedom (3-DoF), which means that head rotation in three axes yaw/pitch/roll can be taken into account. However, the development of VR/AR/MR applications is eventually leading to six degrees-of-freedom (6-DoF) volumetric virtual reality, where the user is able to freely move in a Euclidean space (x, y, z) and rotate his/her head (yaw, pitch, roll).

SUMMARY

Various examples include methods, apparatuses and computer readable media comprising a computer program or a signal stored therein, which are characterized by what is stated in the independent claims. Various details of some example embodiments are disclosed in the dependent claims and in the corresponding images and description.

According to a first aspect, there is provided an apparatus comprising means for performing:
obtaining information of a viewing volume appropriate for viewing a volumetric video;
examining the viewing volume to determine what geometrical shapes describe the viewing volume;
selecting one or more geometrical shapes determined for describing the viewing volume; and
constructing signalling information for the selected one or more geometrical shapes.

According to a second aspect, there is provided a method comprising:
obtaining information of a viewing volume appropriate for viewing a volumetric video;
examining the viewing volume to determine what geometrical shapes describe the viewing volume;
selecting one or more geometrical shapes determined for describing the viewing volume; and
constructing signalling information for the selected one or more geometrical shapes.

According to a third aspect, there is provided an apparatus comprising at least one processor and at least one memory including computer program code, the at least one memory and the computer program code configured to, with the at least one processor, cause the apparatus at least to perform:
obtain information of a viewing volume appropriate for viewing a volumetric video;
examine the viewing volume to determine what geometrical shapes describe the viewing volume;
select one or more geometrical shapes determined for describing the viewing volume; and
construct signalling information for the selected one or more geometrical shapes.

According to a fourth aspect, there is provided a computer program comprising instructions stored thereon for causing an apparatus to perform at least the following:
obtain information of a viewing volume appropriate for viewing a volumetric video;
examine the viewing volume to determine what geometrical shapes describe the viewing volume;
select one or more geometrical shapes determined for describing the viewing volume; and
construct signalling information for the selected one or more geometrical shapes.

According to a fifth aspect, there is provided a signal with embedded data, the signal being encoded in accordance with an encoding process which comprises at least:
obtaining information of a viewing volume appropriate for viewing a volumetric video;
examining the viewing volume to determine what geometrical shapes describe the viewing volume;
selecting one or more geometrical shapes determined for describing the viewing volume; and
constructing signalling information for the selected one or more geometrical shapes.

According to a sixth aspect, there is provided an apparatus comprising means for performing:
receiving information of one of more geometrical shapes describing a viewing volume appropriate for viewing a volumetric video; and
using the received information of one of more geometrical shapes to reconstruct the viewing volume.

According to a seventh aspect, there is provided a method comprising:
receiving information of one of more geometrical shapes describing a viewing volume appropriate for viewing a volumetric video; and
using the received information of one of more geometrical shapes to reconstruct the viewing volume.

According to an eighth aspect, there is provided an apparatus comprising at least one processor and at least one memory including computer program code, the at least one memory and the computer program code configured to, with the at least one processor, cause the apparatus at least to perform:
receive information of one of more geometrical shapes describing a viewing volume appropriate for viewing a volumetric video; and
use the received information of one of more geometrical shapes to reconstruct the viewing volume.

According to a ninth aspect, there is provided a computer program comprising instructions stored thereon for causing an apparatus to perform at least the following:
receive information of one of more geometrical shapes describing a viewing volume appropriate for viewing a volumetric video; and
use the received information of one of more geometrical shapes to reconstruct the viewing volume.

BRIEF DESCRIPTION OF THE DRAWINGS

For a more complete understanding of example embodiments of the present invention, reference is now made to the following descriptions taken in connection with the accompanying drawings in which:

FIGS. 4a to 4c illustrate some examples of viewing volumes, in accordance with an embodiment;

DETAILED DESCRIPTION OF SOME EXAMPLE EMBODIMENTS

In the following, several embodiments will be described in the context of volumetric video coding. It is to be noted, however, that while some of the embodiments are described relating to certain video coding technologies, the invention is not limited to any specific volumetric video technology or standard.

A viewing volume may be defined as a closed region in a volumetric scene, within which an observer may be able to move and view the scene content with full immersion and with all physical aspects of the scene accurately represented. Defining a viewing volume in a volumetric presentation may be useful in (limited) 6 DoF environment where the viewing volume, from where the content can be immersively seen, may need to be restricted and decided beforehand.

Viewing volume can be, for example, a single contained closed volumetric area region or multiple disjoint closed regions viewing locations or multiple volumetric areas regions combined together. Viewing volume representation may be useful in MPEG-I activities e.g. 3DoF+ and upcoming 6DoF areas.

When viewing volumetric content, the content is usually captured/authored from certain locations and data is missing for e.g. back-faces of the objects and other objects behind other foreground objects. For the immersion to stay good the content cannot be viewed from undesired locations, where the user would see missing objects, or more generally missing data from the volumetric representation.

The viewing area may be of any size, very small or very large area. Often the volume might only have valid viewing locations in some parts of the volumetric content. Overall, the shape of the viewing volume can be very complicated in a large 6 DoF scene.

Figure 1:
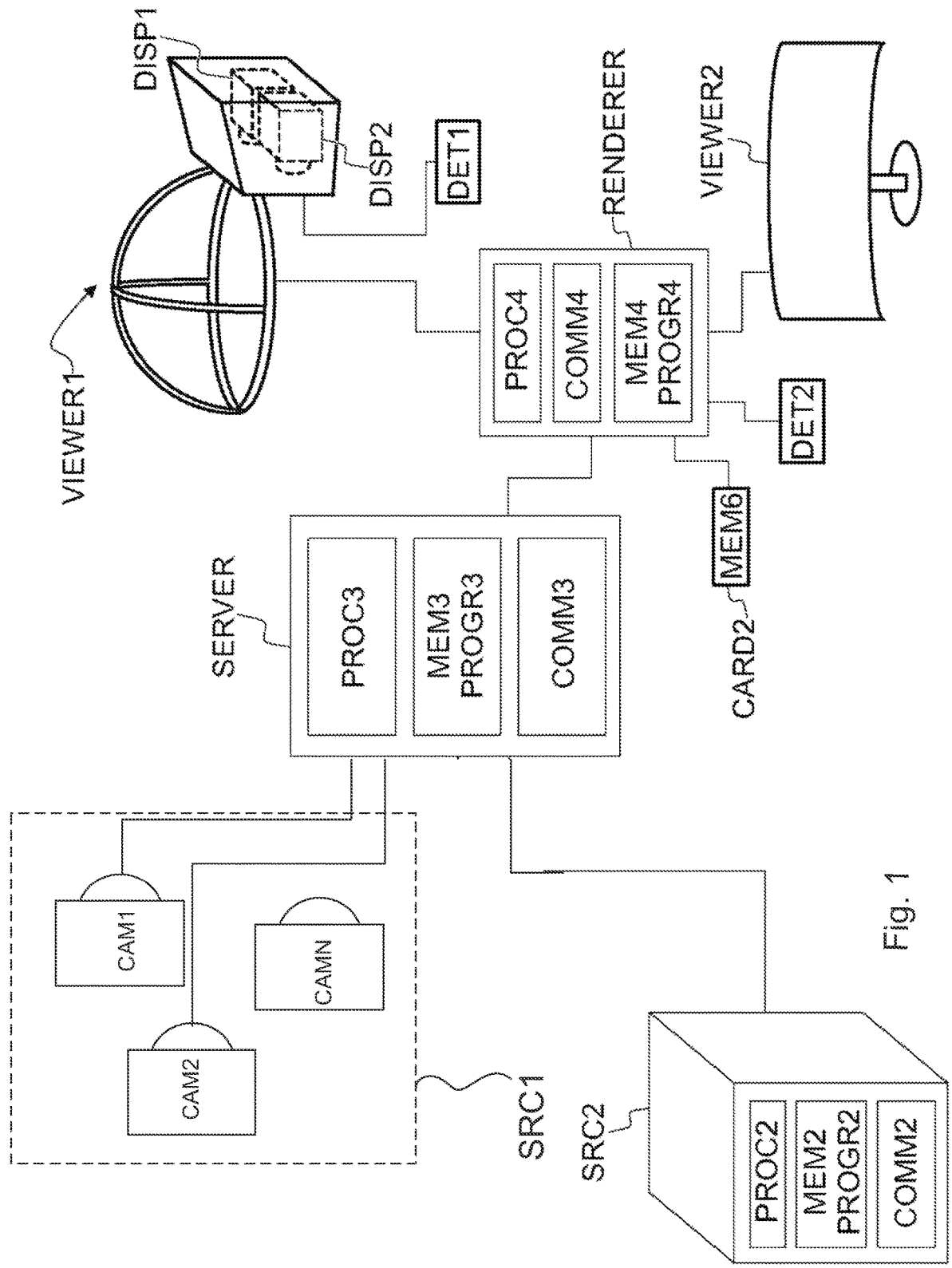
FIG. 1 shows a system capable of capturing and encoding volumetric video and audio data for representing a 3D scene with spatial audio.

FIG. 1 shows a system for capturing, encoding, decoding, reconstructing and viewing a three-dimensional scheme, that is, for 3D video and 3D audio digital creation and playback. The system is capable of capturing and encoding volumetric video and audio data for representing a 3D scene with spatial audio, which can be used as input for virtual reality (VR), augmented reality (AR) and mixed reality (MR) applications. The task of the system is that of capturing sufficient visual and auditory information from a specific scene to be able to create a scene model such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image/audio sources, a server and a rendering device. A video/audio source SRC1 may comprise multiple cameras CAM1, CAM2, ..., CAMN with overlapping field of view so that regions of the view around the video capture device is captured from at least two cameras. The video/audio source SRC1 may comprise multiple microphones uP1, uP2, ..., uPN to capture the timing and phase differences of audio originating from different directions. The video/audio source SRC1 may comprise a high-resolution orientation sensor so that the orientation (direction of view) of the plurality of cameras CAM1, CAM2, ..., CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, ..., CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system. In some embodiments there are no camera devices involved but only one or more audio devices.

One or more two-dimensional video bitstreams and one or more audio bitstreams may be computed at the server SERVER or a device RENDERER used for rendering, or another device at the receiving end. The devices SRC1 and SRC2 may comprise or be functionally connected to one or more computer processors (PROC2 shown) and memory (MEM2 shown), the memory comprising computer program (PROGR2 shown) code for controlling the source device SRC1/SRC2. The image/audio stream captured by the device may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a visual and auditory scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

For viewing and listening the captured or created video and audio content, there may be one or more reproduction devices REPROC1 and REPROC2. These devices may have a rendering module and a display and audio reproduction module, or these functionalities may be combined in a single device. The devices may comprise or be functionally connected to a computer processor PROC4 and memory MEM4, the memory comprising computer program PROG4 code for controlling the reproduction devices. The reproduction devices may consist of a video data stream receiver for receiving a video data stream and for decoding the video data stream, and an audio data stream receiver for receiving an audio data stream and for decoding the audio data stream. The video/audio data streams may be received from the server SERVER or from some other entity, such as a proxy server, an edge server of a content delivery network, or a file available locally in the viewer device. The data streams may be received over a network connection through communications interface COMM4, or from a memory device MEM6 like a memory card CARD2. The reproduction devices may have a graphics processing unit for processing of the data to a suitable format for viewing. The reproduction REPROC1 may comprise a high-resolution stereo-image head-mounted display for viewing the rendered stereo video sequence. The head-mounted display may have an orientation sensor DET1 and stereo audio headphones. The reproduction REPROC2 may comprise a display (either two-dimensional or a display enabled with 3D technology for displaying stereo video), and the rendering device may have an orientation detector DET2 connected to it. Alternatively, the reproduction REPROC2 may comprise a 2D display, since the volumetric video rendering can be done in 2D by rendering the viewpoint from a single eye instead of a stereo eye pair. The reproduction REPROC2 may comprise audio reproduction means, such as headphones or loudspeakers.

It needs to be understood that FIG. 1 depicts one SRC1 device and one SRC2 device, but generally the system may comprise more than one SRC1 device and/or SRC2 device.

The present embodiments relate to providing viewing volume signalling for playback of volumetric video of a 3D scene, such as in the system depicted in FIG. 1. In other words, the embodiments relate to volumetric or six-degrees-of-freedom (6-DoF) video, and more generally to augmented reality (AR) or virtual reality (VR) or mixed reality (MR). AR/VR/MR is volumetric by nature, which means that the user is able to move around in the blend of physical and digital content, and digital content presentation is modified accordingly to user position & orientation.

It is expected that AR/VR/MR is likely to evolve in stages. Currently, most applications are implemented as 3-DoF, which means that head rotation in three axes yaw/pitch/roll can be taken into account. This facilitates the audio-visual scene remaining static in a single location as the user rotates his head.

The next stage could be referred as 3-DoF+(or restricted/limited 6-DoF), which will facilitate limited movement (translation, represented in Euclidean spaces as x, y, z). For example, the movement might be limited to a range of some tens of centimeters around a location.

The ultimate target is 6-DoF volumetric virtual reality, where the user is able to freely move in an Euclidean space (x, y, z) and rotate his head (yaw, pitch, roll).

It is noted that the term "user movement" as used herein refers any user movement i.e. changes in (a) head orientation (yaw/pitch/roll) and (b) user position performed either by moving in the Euclidian space or by limited head movements.

Figure 2A:
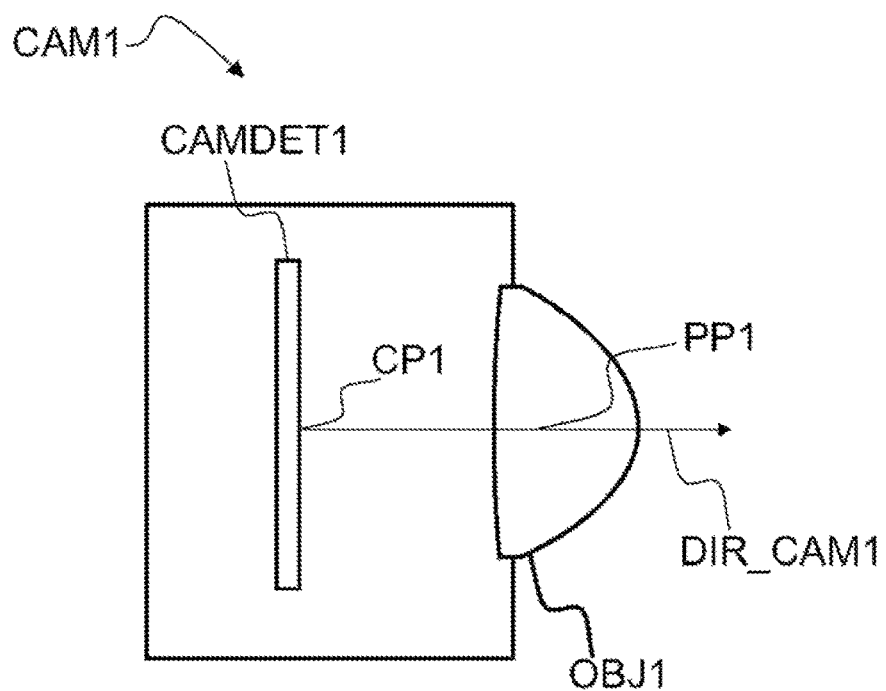
FIGS. 2a and 2b show a capture device and a viewing device.

FIG. 2a illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

Figure 2B:
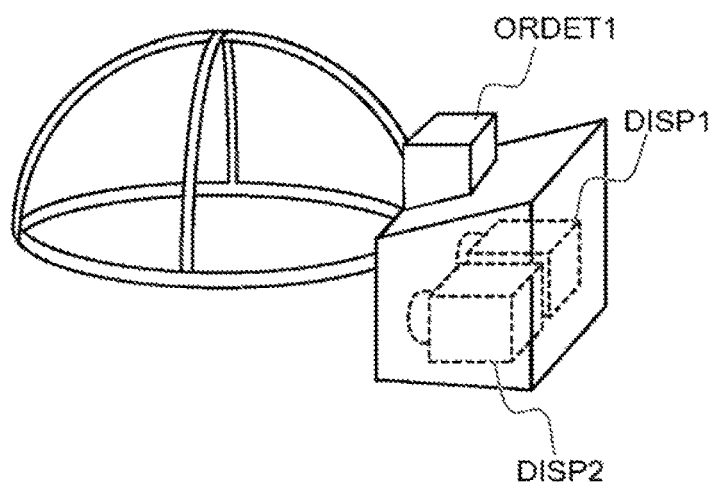

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video, audio and orientation data is first recorded with the capture device. This can consist of multiple concurrent video and audio streams as described above. One or more time-synchronized audio streams may also be recorded with the capture devices. The different capture devices may form image and geometry information of the scene from different directions. For example, there may be three, four, five, six or more cameras capturing the scene from different sides, like front, back, left and right, and/or at directions between these, as well as from the top or bottom, or any combination of these. The cameras may be at different distances, for example some of the cameras may capture the whole scene and some of the cameras may be capturing one or more objects in the scene. In an arrangement used for capturing volumetric video data, several cameras may be directed towards an object, looking onto the object from different directions, where the object is e.g. in the middle of the cameras. In this manner, the texture and geometry of the scene and the objects within the scene may be captured adequately. As mentioned earlier, the cameras or the system may comprise means for determining geometry information, e.g. depth data, related to the captured video streams. From these concurrent video and audio streams, a computer model of a scene may be created. Alternatively or additionally, a synthetic computer model of a virtual scene may be used. The models (at successive time instances) may then be transmitted immediately or later to the storage and processing network for processing and conversion into a format suitable for subsequent delivery to playback devices. The conversion may involve processing and coding to improve the quality and/or reduce the quantity of the scene model data while preserving the quality at a desired level. Each playback device receives a stream of the data (either computed video data or scene model data) from the network, and renders it into a viewing reproduction of the original location which can be experienced by a user. The reproduction may be two-dimensional or three-dimensional (stereo image pairs).

Figure 3A:
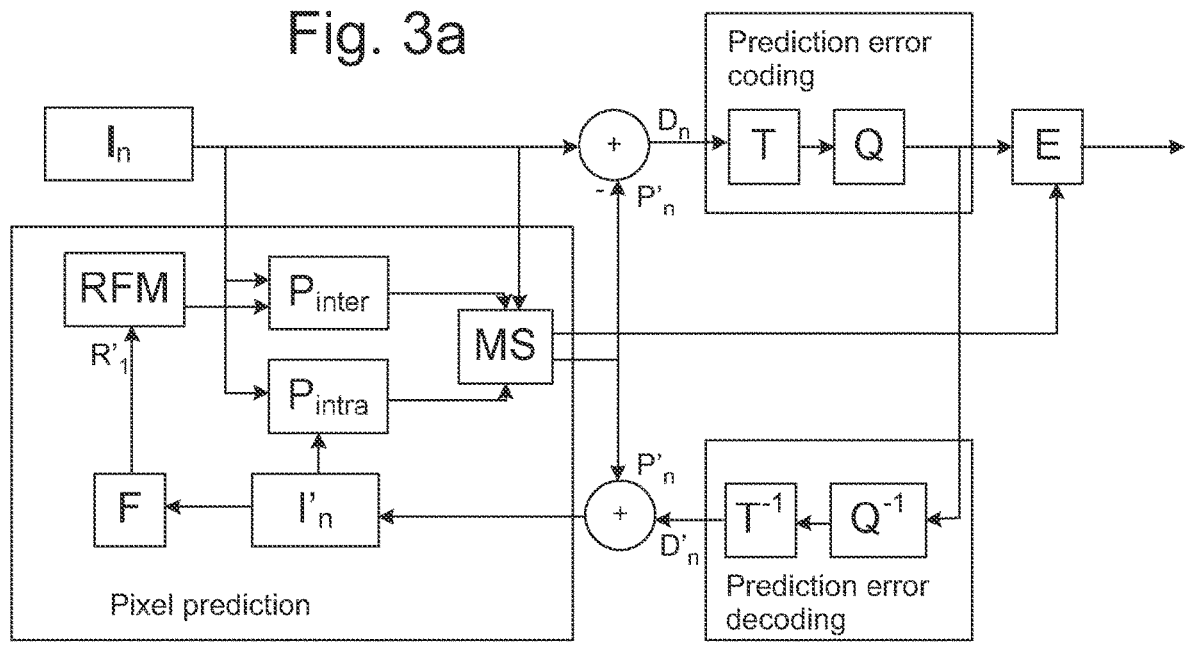
FIGS. 3a and 3b show an encoder and decoder for encoding and decoding texture pictures, geometry pictures and/or auxiliary pictures.
Figure 3B:
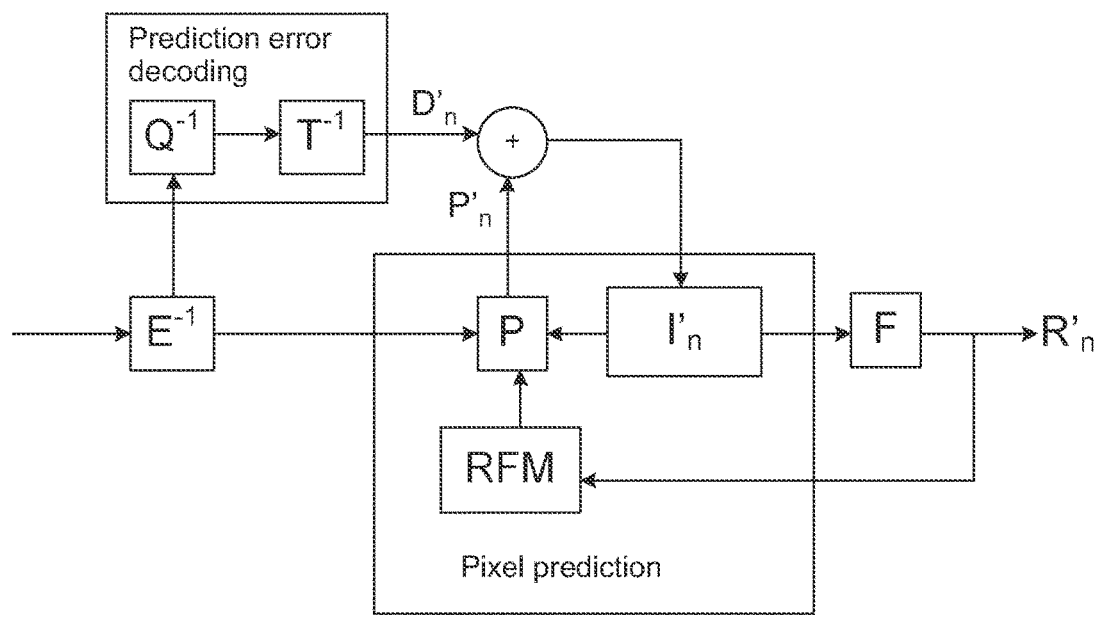

FIGS. 3a and 3b show an encoder and decoder for encoding and decoding texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 3a. FIG. 3a illustrates an image to be encoded (In); a predicted representation of an image block (P'n); a prediction error signal (Dn); a reconstructed prediction error signal (D'n); a preliminary reconstructed image (I'n); a final reconstructed image (R'n); a transform (T) and inverse transform (T−1); a quantization (Q) and inverse quantization (Q−1); entropy encoding (E); a reference frame memory (RFM); inter prediction (Pinter); intra prediction (Pintra); mode selection (MS) and filtering (F).

An example of a decoding process is illustrated in FIG. 3b. FIG. 3b illustrates a predicted representation of an image block (P'n); a reconstructed prediction error signal (D'n); a preliminary reconstructed image (I'n); a final reconstructed image (R'n); an inverse transform (T−1); an inverse quantization (Q−1); an entropy decoding (E−1); a reference frame memory (RFM); a prediction (either inter or intra) (P); and filtering (F).

Head Mounted Displays (HMD) are one typical way of using virtual reality and augmented reality content. In the following, the head mounted displays are mainly used as an example of the playback device, but several embodiments are equally applicable to mobile devices, computers i.e. anything that can present user a virtual reality and/or augmented reality world, user's location in it and play audio.

In the following description, location will be used interchangeably with direction and distance. Typically, location is used so that one point is a center point and that gets a coordinate x, y, z=[0,0,0]. The center point is typically in a place where the producers would want the user to start experiencing the content. Direction and distance parameters define other locations with respect to the center point similarly to other location parameters.

In the following, there is provided a more detailed description of some embodiments regarding constructing, signalling and streaming of the viewing volume(s) as well as client-side handling of the viewing volume(s).

The viewing volume can be a single small volume or a combination of two or more volumes. The volumes may be arbitrary shaped and/or determined by some criteria, such as on the basis of constellation and properties of devices used in capturing volumetric video. As an example, a capturing device which is able to capture 360 degree video may provide a spherical viewing volume centered at the center of the capturing device. In accordance with an embodiment, a robust way of describing this area using Boolean operations may be used.

It may be beneficial to have simple shapes, like cubes and spheres to describe the viewing volume(s). This is due to the expected desired movement of the users. Limited 6 DoF content offer usually just a small viewing volume, for example a sphere with 25 centimetre radius. Camera arrays, and light field capturing systems as well may operate and have valid data for only small areas with, for example, rectangle, cubic or spherical viewing volumes.

The viewing volume may be represented by using one or more, relatively simple geometric shapes such as axis-aligned boxes, spheres, half-planes etc. If the viewing volume is represented by a combination of more than one geometric shape, the combination may be based on, for example, a Boolean combination of simple geometric shapes (primitives).

In accordance with an embodiment, the viewing volume is constructed as a Boolean combination of simple primitives. The basic primitives and relevant parameters may include, for example, axis-aligned boxes, spheres and/or half-spaces. Parameters for describing the axis-aligned boxes may comprise minimum and maximum extents in X, Y, and Z directions, spheres may be described with a center and a radius, and parameters for half-spaces may comprise plane equation, or plane normal and offset from an origin of the half-space.

The Boolean operations for combining the basic primitives may at least comprise, for example, a union by which two or more primitives are added to the viewing volume, an intersection of two or more primitives in which only the volume common to each of the two or more primitives form the combination, and a difference by which one or more primitives are subtracted from the viewing volume. It may also be possible to form the combination so that an intersection of the two or more geometrical shapes is excluded from the total volume of the two or more geometrical shapes and what remains is used as the viewing volume.

In one embodiment, the viewing volume is represented as two lists, one containing additive and one subtractive primitives: the additive primitives combine into a merged volume, out of which the subtractive primitives are then subtracted. This enables simple construction of very complex viewing volumes, some examples of which are shown in FIGS. 4a to 4c in accordance with an embodiment.

FIG. 4a illustrates an example of a basic inside-out viewing volume 400 comprising a sphere 402. FIG. 4b illustrates an example of combined viewing volume 400 for an L-shaped room which is obtained by combining a first square 404 and a second square 406 by Boolean subtraction. FIG. 4c illustrates an example of a spherical viewing volume 400 around an object 412, which is obtained by combining a first sphere 408 and a second sphere 410 by Boolean subtraction. In FIGS. 4a, 4b and 4c additive primitives 402, 404, 408 are shown as solid white objects while subtractive primitives 406, 410 have a dashed outline. The remaining hashed area is the valid viewing volume 400.

Figure 5A:
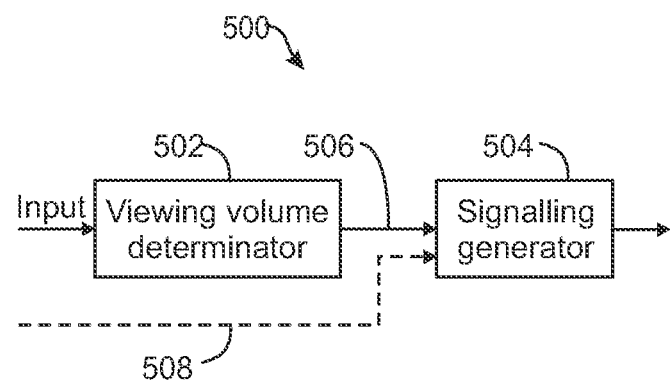
FIG. 5a shows a simplified block diagram of a viewing volume information constructor, in accordance with an embodiment.
Figure 6A:
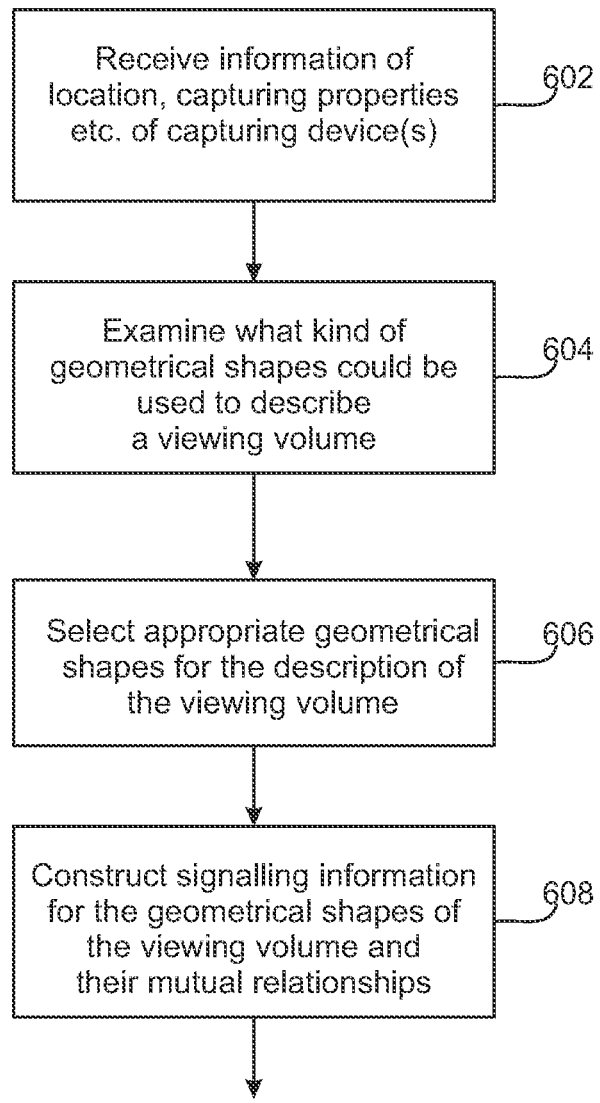
FIG. 6a shows a flow diagram of a method for constructing viewing volume information according to an embodiment.

FIG. 5*a* illustrates an example of a viewing volume information constructor 500 and FIG. 6*a* is a flow diagram of a method for constructing viewing volume information, in accordance with an embodiment. The viewing volume information constructor 500 may receive 602 information of location, capturing properties etc. of devices used in capturing a volumetric video. This information may be processed by a viewing volume determinator 502 which examines 604 what kind or primitives could be used and how to combine them to obtain the viewing volume for the volumetric video. In other words, the viewing volume determinator 502 may select 606 primitives to be used and operations for combining the primitives. Information of the selected primitives and operations are provided to a signalling generator 504 which uses the selected primitives and operations to construct 608 proper signalling for delivering information of the viewing volume 400 to a receiving side (client side). There may be different ways to signal this information. In one embodiment a so-called ISOBMFF (International Organization for Standardization Base Media File Format) type of signalling may be used, wherein ISOBMFF data structures are obtained which can be encoded and transmitted to the receiving side.

Encoded information may be transmitted in or along, for example, 6DoF/limited 6DOF stream metadata.

In accordance with an embodiment, the viewing volume information constructor 500 may obtain the viewing volume information in or along a volumetric video wherein the viewing volume determinator 502 may not be needed and the obtained viewing volume information may be provided 508 to the signalling generator 504.

Figure 5B:
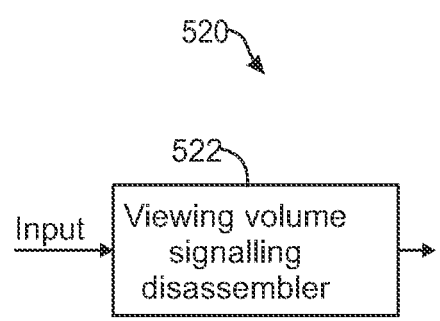
FIG. 5b shows a simplified block diagram of a viewing volume information reconstructor, in accordance with an embodiment.
Figure 6B:
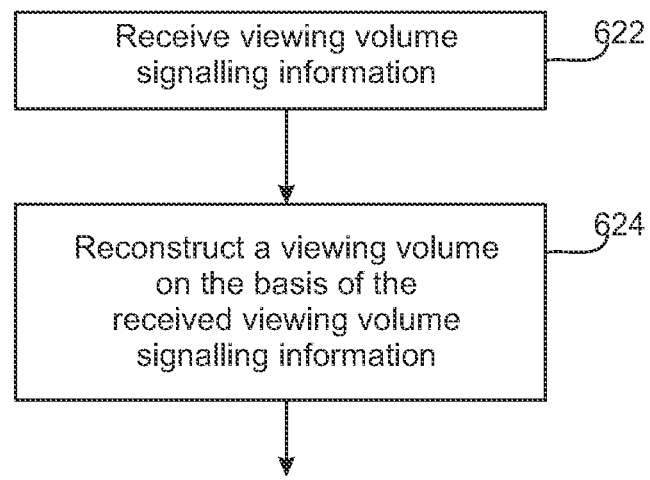
FIG. 6b shows a flow diagram of a method for reconstructing viewing volume information according to an embodiment.

FIG. 5*b* illustrates an example of a viewing volume information reconstructor 520 and FIG. 6*b* is a flow diagram of a method for reconstructing viewing volume information, in accordance with an embodiment. The viewing volume information reconstructor 520 receives 622 viewing volume signalling constructed by the viewing volume information constructor 500 and a viewing volume signalling disassembler 522 of the viewing volume information reconstructor 520 uses the signalling to reconstruct 624 the viewing volume information. In accordance with an embodiment, the viewing volume information reconstructor 520 performs runtime combination with Boolean operations to create a signed distance field of the viewing volume(s).

Figure 7:
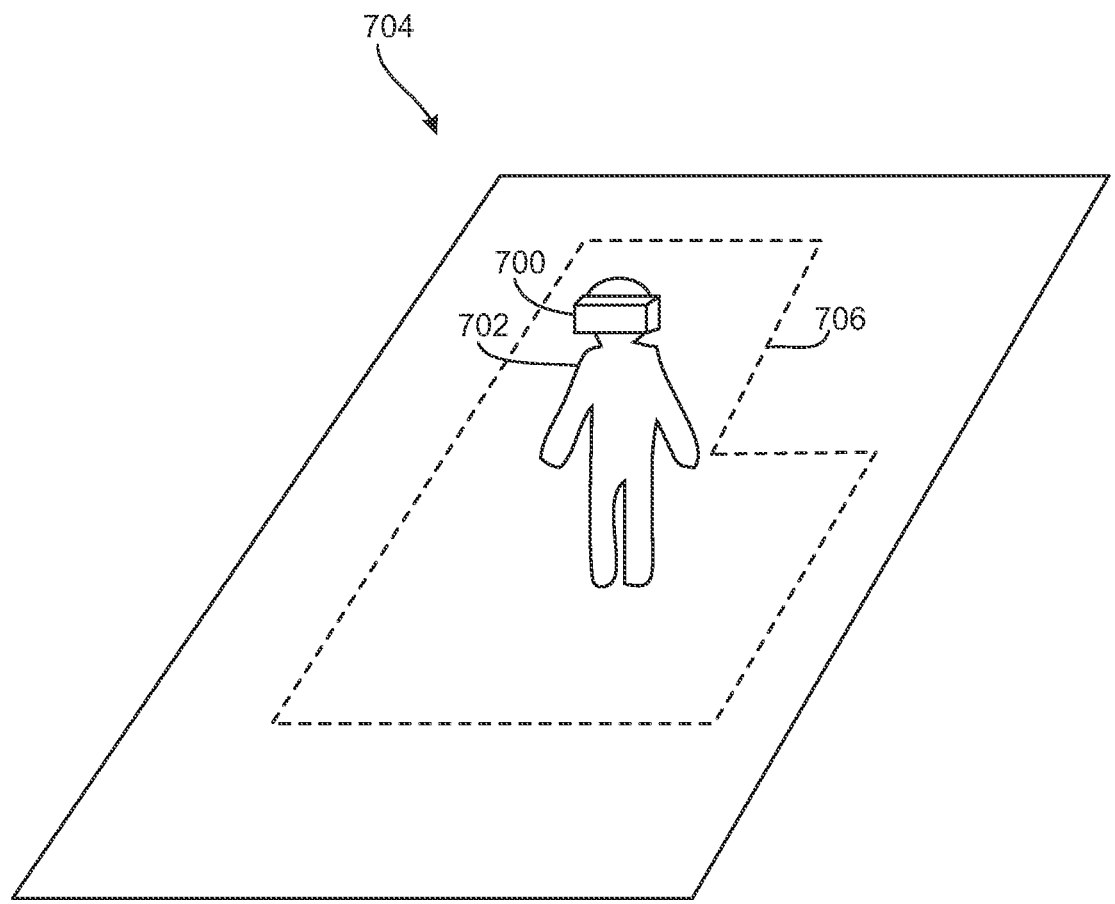
FIG. 7 shows an example of a user using a head mounted display for watching volumetric video.

The reconstructed viewing volume(s) may be used by a video playback device 700 (FIG. 7) (also called as a client in this specification) as a guidance to a user 702 e.g. as follows.

When the user watches the volumetric video e.g. by using a head mounted display 700 for example in a room 704, the location and pose of the head mounted display 700 is tracked. When the user approaches an edge of the viewing volume (illustrated with a dashed line 706 in FIG. 7, as an example), this may be indicated e.g. so that some kind of visual and/or audible hints are generated. In accordance with an embodiment, the content displayed by the head mounted display 700 may be blended out or blurred if the user is moving away from the desired volume 706. In other words, the head mounted display 700 can extract its current signed distance to viewing volume surfaces/borders and give visual hints.

Some further examples of utilizing the location of the client with respect to the viewing volume will be provided in the following.

The client may use the viewing volume to manipulate the view when approaching or crossing the viewing volume boundary. For each elementary primitive, a signed distance between the surface of the primitive and the 3D viewpoint may be calculated and these distances can be combined into a signed distance to the surface of the entire composite viewing volume. Therefore, a function $SDF(p, V)$ exists between the viewpoint p and the viewing volume V that can be readily used to measure a) whether the viewer is inside or outside of the viewing volume, and b) how far from the viewing volume boundary the viewer is.

In one embodiment, the client will fade the rendering to black when the viewer steps outside the viewing volume ($SDF(p, V)>0$), in order to avoid rendering invalid data. In order to smooth the transition, there may be additional fade start and end distances $d_{start}$ and $d_{end}$, and the fade may start when $SDF(p, V)=d_{start}$, reaching full black at $SDF(p, V)=d_{end}$. It should be noted that $d_{start}$ may typically be negative, i.e., inside the surface, while $d_{end}$ may be zero or positive, i.e., outside the surface of the viewing volume.

Other kinds of visual manipulations are also possible. For example, the client may blur the image when approaching the viewing volume boundary, or render the viewing volume boundary as a visible grid when approaching it.

In the following, some examples of signalling the viewing volume will be shortly described.

As described above, the elementary primitives may be quite easy to represent, and the required signalling for transmitting the viewing volume data to the client may be quite small. International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format). ISOBMFF is the base for derivation of all the above mentioned file formats. Some example embodiments are described in conjunction with the ISOBMFF or its derivatives, however, the present disclosure is not limited to ISOBMFF, but rather the description is given for one possible basis on top of which an example embodiment of the present disclosure may be partly or fully realized. In one embodiment, the viewing volume can be stored in an ISOBMFF box or similar. The required data for each primitive is primitive type followed by the parameters mentioned above, either in floating-point or fixed point coding.

The viewing volume may static and need to be transmitted/signalled in the beginning of the session, but it can also be made dynamic, timed metadata, wherein information of the viewing volume may be transmitted/signalled when there is a change in the viewing volume, or if all viewing volumes are known at the beginning of transmission of the volumetric video, information of all viewing volumes related to the volumetric video may be transmitted e.g. at the beginning of the volumetric video, wherein the client may store information of each viewing volume and switch to use a proper viewing volume when there is a change of the viewing volume in the volumetric video. As an example, a combination of Sample group description box and the sample to group box defined in ISO/IEC 14496-12 may be used in the signalling. The viewing volume may be described in the sample group description box and each sample of the volumetric video may then be associated to one of the entries in the sample group description box.

In accordance with an embodiment, two aspects shall be signalled to approximately generate an arbitrary viewing volume. The first aspect is a listing of all primitives used, and the second aspect is an operation sequence that would result in the final viewing volume.

In the following, an embodiment of how such a signalling can be achieved using ISOBMFF is described. Every primitive is derived from a Box. The PrimitiveContainerBox ('prim') lists the primitives that are used in the formation of a viewing volume. The OperationSequence box ('oseq') lists the operations to be performed on primitives and these operations are listed in the box from left to right.

```
aligned(8) class Primitive(primitive_type)
extends Box(primitive_type) {
}
aligned(8) class PrimitiveContainerBox
extends Box('prim') {
   primitive Primitive( ) [ ]
}
aligned(8) class OperationSequence
extends FullBox('oseq', version, flags) {
   while (not end_of_box) {
      bit(02) operator;
      bit(06) reserved;
      unsigned int(08) num_primitives;
      for (i = 0; i < num_primitives; i++) {
         unsigned int(32) primitive_id;
      }
   }
}
```

Semantics is as follows.

operator identifies the binary operation to be performed on the primitives which are listed after the reserved field following the operator field. The mapping of operators to the values in this field may be, for example: {00: OR, 01: XOR, 10: AND, 11: NOT}. The NOT operator is a unary operation and is its use may not be allowed in the Operation sequence box. However, the NOT operator is a valid operator when used in the 'grup' type primitive box.

primitive_id is an index of primitives used in the binary operation. The primitive_id may be, for example, one based index and based on the order of listing of primitives in the PrimitiveContainerBox.

Examples of descriptions of some geometric shapes are now disclosed. The sphere may be defined by:

```
aligned(8) class Sphere
extends Primitive('sphr') {
   bit(32) center[3]; /* IEEE 754 floating point representation */
   bit(32) radius;    /* IEEE 754 floating point representation */
}
``` center is a representation of the location of the center of the spheres radius in scene coordinate system. It may be expressed e.g. as a 32 bit parameter according to IEEE standard for floating-point arithmetic (IEEE 754).

radius is a representation of the radius of the sphere primitive. It also can be expressed e.g. as a 32 bit parameter according to IEEE 754.

The cuboid may be defined by:

```
aligned(8) class Cuboid
extends Primitive('cubd') {
   bit(32) min[3];   /* IEEE 754 floating point representation */
   bit(32) max[3];   /* IEEE 754 floating point representation */
}
``` min are minimum values of the x, y, z coordinates of the cuboid represented e.g. in IEEE 754 32 bit representation.

max are maximum values of the x, y, z coordinates of the cuboid represented e.g. in IEEE 754 32 bit representation.

The group may be defined by:

```
aligned(8) class Group
extends Primitive('grup') {
   bit(02) operator;
   bit(06) reserved;
   unsigned int(32) primitive_id[ ];
}
```

Semantics of the operator and primitive_id may be the same as in the class OperationSequence i.e. the operator identifies the binary operation to be performed on the primitives which are listed after the reserved field following the operator field, and the primitive_id is an index of primitives used in the binary operation.

Using the approaches presented above may provide some advantages. For example, minimal representation of arbitrary viewing volumes may be achieved, low bitrate signalling of the viewing volume may be sufficient, reconstruction in the client side may be relatively fast, and exact viewing volume representation with distance function combinations may be obtained.

Figure 8:
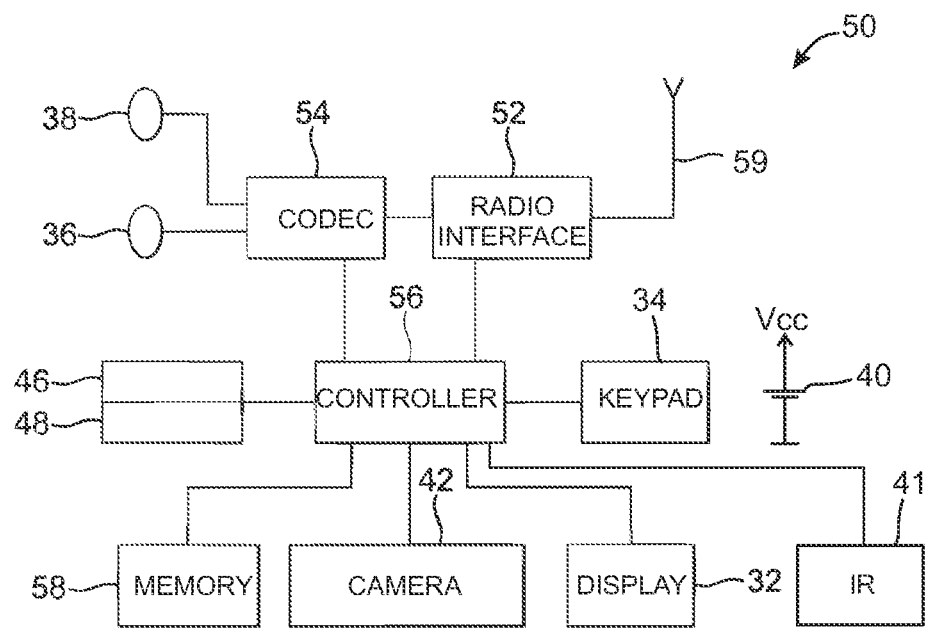
FIG. 8 shows a block diagram of an apparatus according to an example embodiment.
Figure 9:
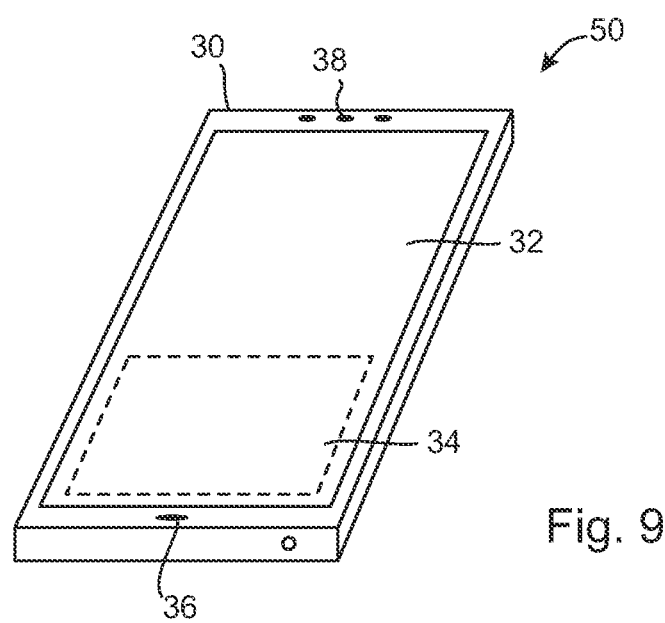
FIG. 9 shows an apparatus according to an example embodiment.

The following describes in further detail suitable apparatus and possible mechanisms for implementing some embodiments. In this regard reference is first made to FIG. 8 which shows a schematic block diagram of an exemplary apparatus or electronic device 50 depicted in FIG. 9, which may incorporate a transmitter according to an embodiment.

The electronic device 50 may for example be a mobile terminal or user equipment of a wireless communication system. However, it would be appreciated that some embodiments may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments the display may be any suitable display technology suitable to display an image or video. The apparatus 50 may further comprise a keypad 34. In other embodiments any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in some embodiments may be any one of: an earpiece 38, speaker, or an analogue audio or digital audio output connection. The apparatus 50 may also comprise a battery 40 (or in other embodiments the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in some embodiments may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 59 connected to the radio interface circuitry 52 for transmitting radio frequency signals generated at the radio interface circuitry 52 to other apparatus(es) and for receiving radio frequency signals from other apparatus(es).

In some embodiments, the apparatus 50 comprises a camera 42 capable of recording or detecting imaging.

Figure 10:
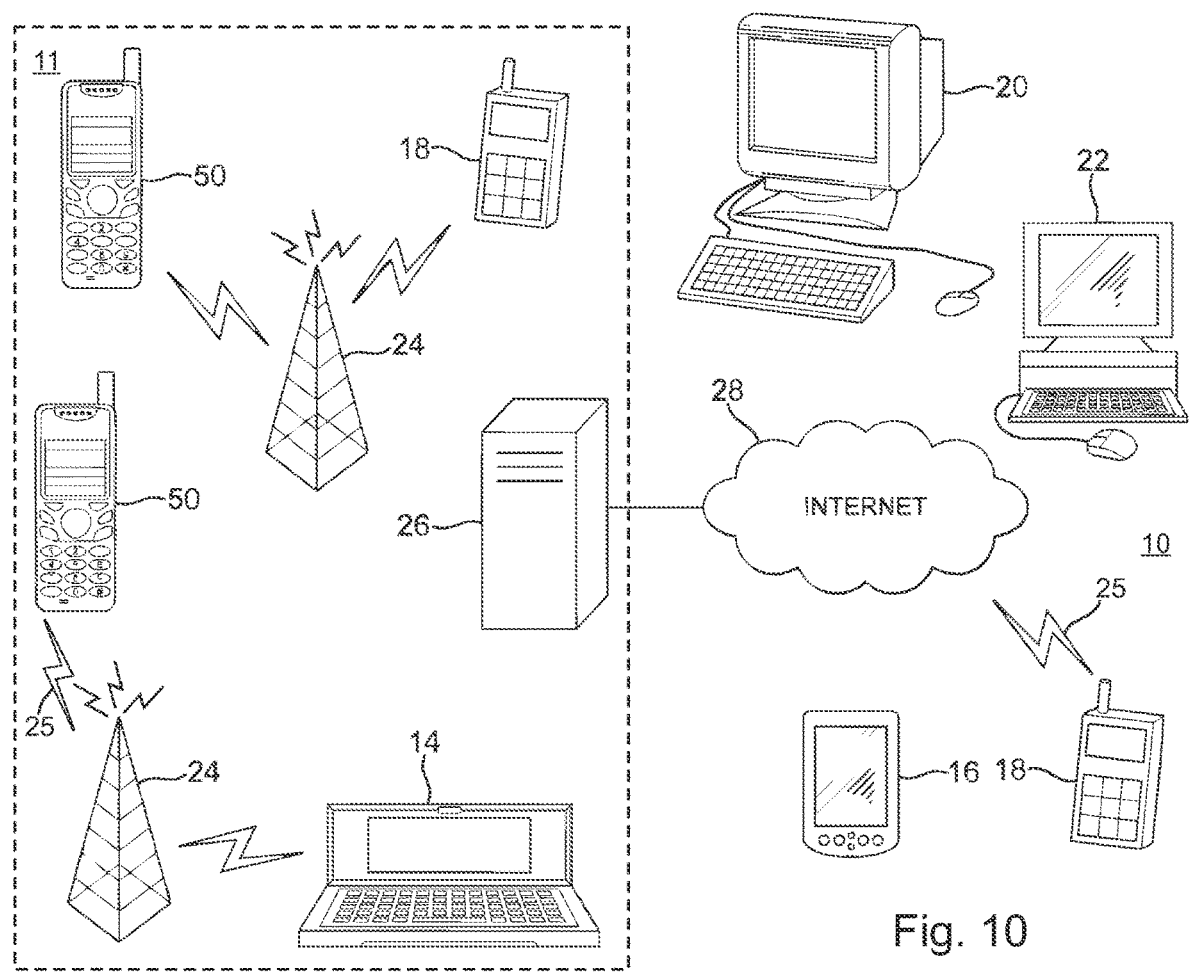
FIG. 10 shows an example of an arrangement for wireless communication comprising a plurality of apparatuses, networks and network elements.

With respect to FIG. 10, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 10 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

Although the above examples describe some embodiments operating within a wireless communication device, it would be appreciated that embodiments as described above may be implemented as a part of any apparatus comprising a circuitry in which radio frequency signals are transmitted and/or received. Thus, for example, embodiments may be implemented in a mobile phone, in a base station, in a computer such as a desktop computer or a tablet computer comprising radio frequency communication means (e.g. wireless local area network, cellular radio, etc.).

In general, the various embodiments may be implemented in hardware or special purpose circuits or any combination thereof. While various aspects may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiments. However, various modifications and adaptations may become apparent to those skilled in the relevant arts in view of the foregoing description, when read in conjunction with the accompanying drawings and the appended claims.

The invention claimed is:

1. An apparatus comprising at least one processor and at least one non-transitory memory, said at least one memory including computer program code, the at least one memory and the computer program code configured to, with the at least one processor, cause the apparatus at least to:
    obtain information of a viewing volume appropriate for viewing a volumetric video;
    determine which geometrical shapes describe the viewing volume;
    select two or more geometrical shapes determined for describing the viewing volume;
    determine mutual relationship of the selected two or more geometrical shapes;
    construct signaling information comprising at least one syntax element for the selected two or more geometrical shapes, wherein the signaling information comprises information of the mutual relationship;
    wherein the at least one syntax element comprises a listing of the selected two or more geometrical shapes, and an operation sequence on the selected two or more shapes, the operation sequence configured to be used to define the viewing volume; and
    transmit the signaling information comprising the at least one syntax element to a client consuming the volumetric video.

2. The apparatus according to claim 1, wherein the at least one memory and the computer program code are further configured to, with the at least one processor, further cause the apparatus to use Boolean operators in the determination of the mutual relationship.

3. The apparatus according to claim 2 wherein the at least one memory and the computer program code are further configured to, with the at least one processor, further cause the apparatus to perform at least one of the following:
    combine two or more geometrical shapes with forming a union of the two or more geometrical shapes;
    combine two or more geometrical shapes with forming an intersection of the two or more geometrical shapes;
    combine two or more geometrical shapes with subtracting one geometrical shape from another geometrical shape; or
    combine two or more geometrical shapes with excluding an intersection of the two or more geometrical shapes from the two or more geometrical shapes.

4. The apparatus according to claim 1, wherein the geometrical shapes are represented as additive primitives and subtractive primitives, and wherein the at least one memory and the computer program code are further configured to, with the at least one processor, further cause the apparatus to:
    maintain a first list for containing information of the additive primitives; and
    maintain a second list for containing information of the subtractive primitives.

5. The apparatus according to claim 4, wherein the at least one memory and the computer program code are further configured to, with the at least one processor, further cause the apparatus to:
    combine additive primitives into a merged volume; and
    subtract the subtractive primitives from the merged volume to obtain the viewing volume.

6. An apparatus comprising at least one processor and at least one non-transitory memory, said at least one memory including computer program code, the at least one memory and the computer program code configured to, with the at least one processor, cause the apparatus at least to:
    receive information of two or more geometrical shapes describing a viewing volume appropriate for viewing a volumetric video;
    receive signaling information comprising at least one syntax element for the two or more geometrical shapes, wherein the signaling information comprises information of a mutual relationship of the two or more geometrical shapes;
    wherein the at least one syntax element comprises a listing of the selected two or more geometrical shapes, and an operation sequence on the selected two or more shapes, the operation sequence configured to be used to define the viewing volume; and
    use the received information of the two or more geometrical shapes and the at least one syntax element to consume, with a client, the volumetric video.

7. A method comprising:
    obtaining information of a viewing volume appropriate for viewing a volumetric video;
    determining which geometrical shapes describe the viewing volume;
    selecting two or more geometrical shapes determined for describing the viewing volume;
    determining mutual relationship of the selected two or more geometrical shapes;
    constructing signaling information comprising at least one syntax element for the selected two or more geometrical shapes, wherein the signaling information comprises information of the mutual relationship;
    wherein the at least one syntax element comprises a listing of the selected two or more geometrical shapes, and an operation sequence on the selected two or more shapes, the operation sequence configured to be used to define the viewing volume; and
    transmitting the signaling information comprising the at least one syntax element to a client consuming the volumetric video.

8. The method according to claim 7 further comprising: using Boolean operators in the determination of the mutual relationship.

9. The method according to claim 8 further comprising at least one of the following:
combining two or more geometrical shapes with forming a union of the two or more geometrical shapes;
combining two or more geometrical shapes with forming an intersection of the two or more geometrical shapes;
combining two or more geometrical shapes with subtracting one geometrical shape from another geometrical shape; or
combining two or more geometrical shapes with excluding an intersection of the two or more geometrical shapes from the two or more geometrical shapes.

10. The method according to claim 7, wherein the geometrical shapes are represented as additive primitives and subtractive primitives, wherein the method further comprises:
maintaining a first list for containing information of the additive primitives; and
maintaining a second list for containing information of the subtractive primitives.

11. The method according to claim 10 further comprising: combining additive primitives into a merged volume; and subtracting the subtractive primitives from the merged volume to obtain the viewing volume.

12. A non-transitory computer-readable medium comprising program instructions stored thereon which are configured to, when executed with at least one processor, cause the at least one processor to perform the method of claim 7.

13. The apparatus according to claim 6, wherein the at least one memory and the computer program code are further configured to, with the at least one processor, further cause the apparatus to:
use the received information of the two or more geometrical shapes and the at least one syntax element to reconstruct the viewing volume.

14. The apparatus according to claim 6, wherein the at least one memory and the computer program code are further configured to, with the at least one processor, further cause the apparatus to perform at least one of the following on the basis of the received information of the two or more geometrical shapes to obtain the viewing volume:
combine two or more geometrical shapes with forming a union of the two or more geometrical shapes;
combine two or more geometrical shapes with forming an intersection of the two or more geometrical shapes;
combine two or more geometrical shapes with subtracting one geometrical shape from another geometrical shape; or
combine two or more geometrical shapes with excluding an intersection of the two or more geometrical shapes from the two or more geometrical shapes.

15. The apparatus according to claim 6, wherein the geometrical shapes are represented as additive primitives and subtractive primitives, and wherein the at least one memory and the computer program code are further configured to, with the at least one processor, further cause the apparatus to:
receive and maintain a first list for containing information of the additive primitives; and
receive and maintain a second list for containing information of the subtractive primitives.

16. The apparatus according to claim 6, wherein the at least one memory and the computer program code are further configured to, with the at least one processor, further cause the apparatus to:
obtain information of location and pose of a display carried with a user;
use the obtained information for determining the location of the user with respect to the viewing volume; and
provide an indication in response to the determined location approaching an edge of the viewing volume.

17. The apparatus according to claim 6, wherein the apparatus is a head mounted display or a mobile device.

18. A method comprising:
receiving information of two or more geometrical shapes describing a viewing volume appropriate for viewing a volumetric video;
using the received information of the two or more geometrical shapes to consume, with a client, the volumetric video; and
creating a signed distance field of the viewing volume, the signed distance field used to determine a distance a viewer is from a boundary of the viewing volume.

19. The method according to claim 18, further comprising performing at least one of the following on the basis of the received information of the two or more geometrical shapes to obtain the viewing volume:
combining two or more geometrical shapes with forming a union of the two or more geometrical shapes;
combining two or more geometrical shapes with forming an intersection of the two or more geometrical shapes;
combining two or more geometrical shapes with subtracting one geometrical shape from another geometrical shape; or
combining two or more geometrical shapes with excluding an intersection of the two or more geometrical shapes from the two or more geometrical shapes.

20. The method according to claim 18, wherein the geometrical shapes are represented as additive primitives and subtractive primitives, wherein the method further comprises:
receiving and maintaining a first list for containing information of the additive primitives; and
receiving and maintaining a second list for containing information of the subtractive primitives.

21. The method according to claim 18 further comprising:
obtaining information of location and pose of a display carried with a user;
using the obtained information for determining the location of the user with respect to the viewing volume; and
providing an indication in response to the determined location approaching an edge of the viewing volume.

22. The method according to claim 18, wherein the method is performed with a head mounted display or a mobile device.

23. The method of claim 18, further comprising:
measuring, using the signed distance field, a position of the viewer relative to the viewing volume; and
fading a rendering of the viewing volume when the position of the viewer reaches a first distance, and ending the fading of the rendering when the position of the viewer reached a second distance.

24. The method of claim 18, further comprising determining, using the signed distance field, whether the viewer is inside or outside of the viewing volume.

25. A non-transitory computer-readable medium comprising program instructions stored thereon which are configured to, when executed with at least one processor, cause the at least one processor to perform the method of claim 18.

* * * * *